United States Patent
Kirihata et al.

(10) Patent No.: US 9,015,131 B2
(45) Date of Patent: Apr. 21, 2015

(54) INFORMATION MANAGEMENT METHOD, AND COMPUTER FOR PROVIDING INFORMATION

(75) Inventors: Yasuhiro Kirihata, Tokyo (JP); Kouji Nakayama, Tokyo (JP)

(73) Assignee: Hitachi Solutions, Ltd., Tokyo (JP)

(*) Notice: Subject to any disclaimer, the term of this patent is extended or adjusted under 35 U.S.C. 154(b) by 0 days.

(21) Appl. No.: 13/636,058

(22) PCT Filed: Aug. 26, 2011

(86) PCT No.: PCT/JP2011/069248
§ 371 (c)(1),
(2), (4) Date: Sep. 19, 2012

(87) PCT Pub. No.: WO2012/090549
PCT Pub. Date: Jul. 5, 2012

(65) Prior Publication Data
US 2013/0268499 A1    Oct. 10, 2013

(30) Foreign Application Priority Data
Dec. 28, 2010 (JP) .................................. 2010-293455

(51) Int. Cl.
*G06F 17/00* (2006.01)
*G06F 17/30* (2006.01)
*G06F 12/08* (2006.01)

(52) U.S. Cl.
CPC .... *G06F 17/30943* (2013.01); *G06F 17/30156* (2013.01); *G06F 12/0868* (2013.01)

(58) Field of Classification Search
CPC .................. G06F 17/30156; G06F 17/30159; G06F 11/1453
USPC ......................................................... 707/692
See application file for complete search history.

(56) References Cited

U.S. PATENT DOCUMENTS

| | | | |
|---|---|---|---|
| 5,761,432 A * | 6/1998 | Bergholm et al. | 709/226 |
| 8,032,498 B1 * | 10/2011 | Armangau et al. | 707/690 |
| 8,250,035 B1 * | 8/2012 | Tang et al. | 707/639 |
| 8,281,066 B1 * | 10/2012 | Trimmer et al. | 711/103 |

(Continued)

FOREIGN PATENT DOCUMENTS

| | | | |
|---|---|---|---|
| JP | 2009-205201 A | 9/2009 | |
| JP | 2009-230661 A | 10/2009 | |

OTHER PUBLICATIONS

Yoshida, "Donyu Susumu Storage Shin Gijutsu Joho Bakuhatsu ni Makenai 'Jufuku Haijo' Data o Sujubun no Ichi ni Sakugen", Nikkei Computer, Apr. 15, 2009, No. 728, pp. 81 to 85 with English language abstract.

*Primary Examiner* — Phong Nguyen
(74) *Attorney, Agent, or Firm* — Mattingly & Malur, P.C.

(57) ABSTRACT

When an online storage service is used to expand a storage capacity of a file server, an amount of communication in synchronization processing and an amount of data retained on the online storage service are reduced to save an amount of charge. In a kernel module provided with a storage area on the online storage service, files are divided into block files and managed, and blocks overlapping with an already registered and saved block file group are not uploaded, but only configuration information of the files is changed. A mechanism is adopted, in which DBs for managing meta information and elimination of duplication are divided and managed, and only updated sections are appropriately uploaded.

12 Claims, 9 Drawing Sheets

(56) References Cited

U.S. PATENT DOCUMENTS

| | | | |
|---|---|---|---|
| 8,285,690 B2* | 10/2012 | Nakamura et al. | 707/692 |
| 8,458,295 B1* | 6/2013 | Crowell et al. | 709/219 |
| 2009/0217091 A1* | 8/2009 | Miyamoto et al. | 714/19 |
| 2010/0094817 A1* | 4/2010 | Ben-Shaul et al. | 707/697 |
| 2010/0223495 A1* | 9/2010 | Leppard | 714/6 |
| 2011/0231374 A1* | 9/2011 | Jain et al. | 707/692 |
| 2012/0101995 A1* | 4/2012 | Agetsuma et al. | 707/644 |

\* cited by examiner

| File/Directory ID (201) | Parent directory ID (202) | File/Directory name (203) | Stat information (204) | | |
|---|---|---|---|---|---|
| 000····00 | - | / | 11/1/2010 | 512KB | ··· |
| 000····01 | 000····00 | a.txt | 11/4/2010 | 512KB | ··· |
| 000····02 | 000····00 | dir1 | 11/7/2010 | 512KB | ··· |
| 000····03 | 000····02 | b.xls | 11/7/2010 | 512KB | ··· |
| ⋮ | ⋮ | ⋮ | ⋮ | | |

Fig. 3

| Configuration block file ID (301) | Hash value (302) | Reference count (303) |
|---|---|---|
| b00 | ASB009 | 3 |
| b01 | ASB001 | 2 |
| ⋮ | ⋮ | ⋮ |

| Divided DB identification number (601) | Hash value for classifying storage location (mod value) (602) | Dirty flag (603) |
|---|---|---|
| 0 | 0 | OFF |
| 1 | 1 | ON |
| 2 | 2 | OFF |
| ⋮ | ⋮ | ⋮ |

INFORMATION MANAGEMENT METHOD, AND COMPUTER FOR PROVIDING INFORMATION

TECHNICAL FIELD

The present invention relates to an information management method and a computer for providing information, and for example, relates to an information providing server using an online storage service.

BACKGROUND ART

Due to the prosperity of cloud computing, it is predicted that transition from possession of IT to use of IT will be progressed in companies. Under the circumstances, there are more vendors that provide storage services through the Internet. Representative examples of the online storage services include Amazon S3 and Windows (registered trademark) Azure Storage. In general, Web interfaces, such as REST and SOAP, are used to access the online storage services, and fees are charged according to the amount of use of resources. Although problems of security and compliance remain, there is a large advantage in terms of cost. Therefore, it is expected that the use will significantly expand.

In the use of such external online storage services, there is a problem that the amount of charge increases with an increase in the amount of saved data. Since the data is transferred through a WAN, the transfer efficiency is not excellent, and there is a problem that it takes time to save a large amount of data. Furthermore, the fees are charged not only for an amount of storage, but also for an amount of transfer. Therefore, compression of saved and transferred data is an important technique.

Algorithms, such as GZIP and LZH, are typical for systems of data compression in storage. However, in recent years, a system for integrating duplicated data to eliminate a degree of data duplication to realize compression is proposed. For example, an invention of Patent Literature 1 proposes a system in storing a plurality of OS images in a SAN storage, wherein duplication of a common section of the OS images is eliminated to realize a reduction in the storage capacity. In the patent, the storage is divided into a common LU and an individual LU. OS and AP data common to the hosts is stored in the common LU, and host individual data is stored in the individual LU. In this way, duplication is eliminated for the OS and AP data that would be duplicated in conventional techniques, and a reduction in the storage capacity is realized.

CITATION LIST

Patent Literature

Patent Literature 1: JP Patent Publication (Kokai) No. 2009-230661A

SUMMARY OF INVENTION

Technical Problem

However, Patent Literature 1 adopts a system of internally eliminating duplication in the storage. The amount of communication cannot be reduced, and application to the use of general existing online storage services is difficult. Although there is access over WAN in the online storage services, the amount of data transfer on the network is not reduced. Therefore, there is a problem that the system does not lead to an improvement of performance.

The present invention has been made in view of the circumstances, and the present invention provides a technique for realizing both a reduction in an amount of saved data on a storage service side and a reduction of an amount of data transfer from an information providing server to the storage service side in a cloud environment.

Solution to Problem

To solve the problem, the present invention proposes a mechanism of using a duplication elimination technique to realize the reductions in the amount of saved data and the amount of transfer in a system of mounting a logical storage area defined in an online storage service on a specific folder to transparently use the online storage service. To realize an improvement in the performance in a cloud environment, write data is cached in advance by a local cache function, and the data is stored in the online storage service while executing a duplication elimination process based on an asynchronous delayed uploading process. A mechanism is provided, in which databases for management are divided and managed, and only updated sections are appropriately uploaded to the online storage service. Since the compression efficiency in the elimination of duplication varies depending on the data type, whether the elimination of duplication can be applied is managed according to the data type. Based on the mechanisms, an efficient online storage service utilization system with a saved amount of charge is realized.

More specifically, a computer for providing information according to the present invention includes: a configuration block database for managing information of a plurality of configuration blocks obtained by dividing each of a plurality of files; a file configuration database for managing configuration information of the plurality of configuration blocks of the plurality of files; and a meta information database for managing meta information including a directory configuration of each of the plurality of files. Each of the configuration block database, the file configuration database, and the meta information database includes a plurality of divided databases formed by dividing stored information. In the computer for providing information, duplication in the plurality of configuration blocks stored in the configuration block database is eliminated to generate a duplication-eliminated configuration block group. Information of a degree of duplication indicating a degree of each of the plurality of configuration blocks being commonly used in other files is managed. The duplication-eliminated configuration block group, the configuration information of the plurality of configuration blocks, and the meta information are uploaded to the online storage service.

Advantageous Effects of Invention

According to the present invention, both the reduction in the amount of saved data on the storage service side and the reduction in the amount of data transfer from the information providing server to the storage service side can be realized in the cloud environment.

Other problems, configurations, and advantageous effects will become apparent from the following description of embodiments and the attached drawings.

DESCRIPTION OF EMBODIMENTS

The present invention relates to a system of dividing files to eliminate data duplication, saving data in an external storage service to save an amount of charge for an amount of storage, and reducing an amount of data transferred through a WAN to improve transfer efficiency while reducing an amount of charge for data transfer.

Hereinafter, an embodiment of the present invention will be described with reference to the attached drawings. However, the present embodiment is just an example for realizing the present invention, and it should be noted that the present embodiment does not limit the technical scope of the present invention. Common components in the drawings are designated with the same reference numerals.

Although a DB will be expressed as a "table" to describe information in the DB in the following description, the information may not always be expressed by a data structure of a table, and the information may be expressed by data structures, such as a list and a queue, or in other ways. Therefore, a "table", a "list", a "DB", a "queue", and the like can be called "information" to indicate independence of the data structure.

Expressions, such as "identification information", "identifier", "title", "name", "appellation" and "ID", can be used to describe the content of the information, and the expressions can replace each other.

In the following description, a "module" is handled as a subject. However, functions of the module can also be realized by a program. In this case, the program can be executed by a processor to execute a defined process using a memory and a communication port (communication control apparatus). Therefore, the processor may be handled as a subject in the description.

<Configuration of System>

Figure 1:
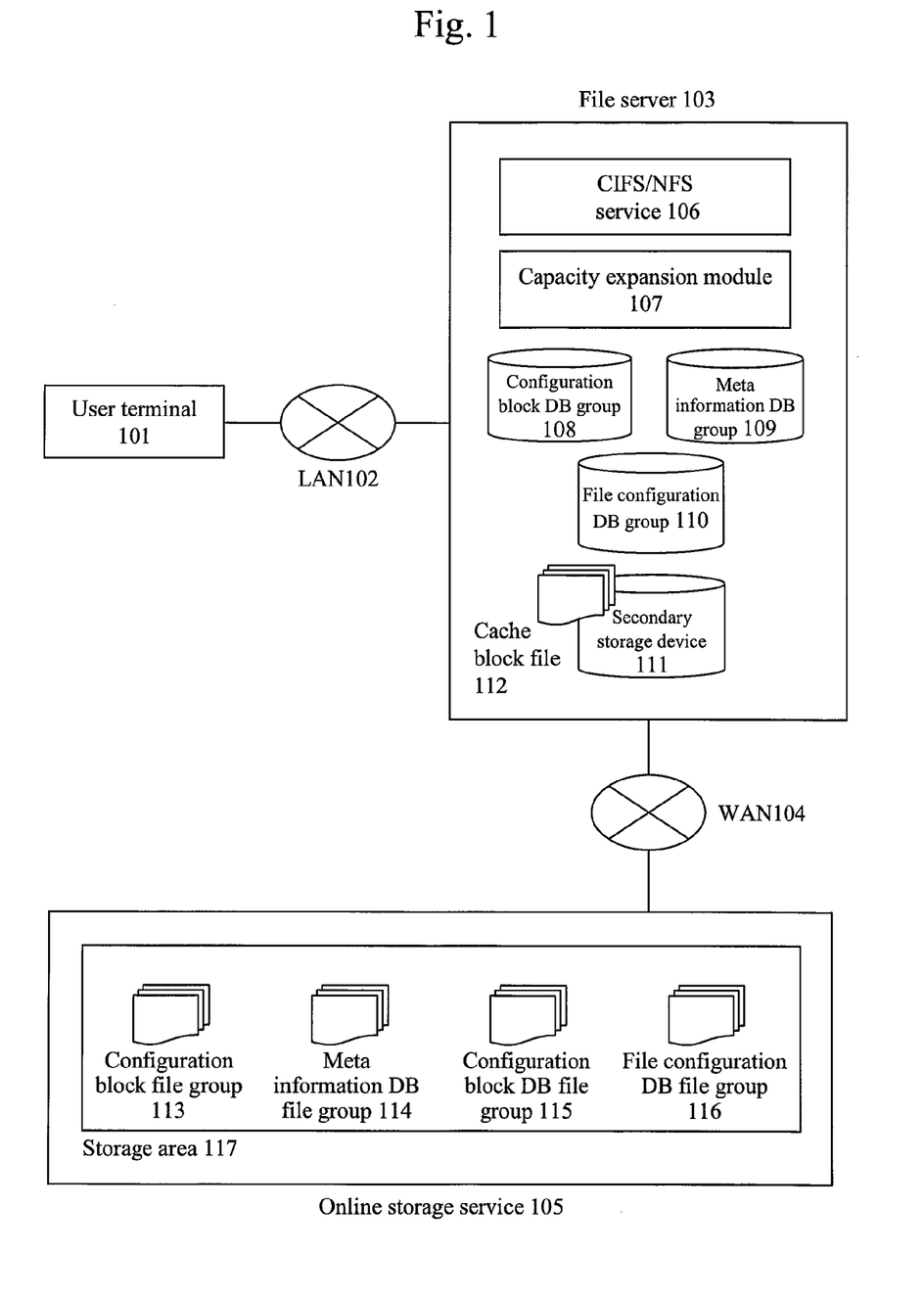
FIG. 1 is a diagram showing a schematic configuration of an information processing system according to an embodiment of the present invention.

FIG. 1 is a diagram showing a schematic configuration of an information providing system (also called an information processing system) according to an embodiment of the present invention. The information providing system includes a file server 103, a user terminal 101, and an online storage service 105.

The user terminal 101 can be connected to the file server 103 through a LAN 102, and the file server 103 can be connected to the online storage service 105 through a WAN 104. The file server 103 is only described as a representative server that provides information, and the arrangement is not limited to this. Therefore, the file server can be reread as an information providing server such as a Web server.

The online storage service 105 discloses and provides a Web interface for accessing storage, and the storage can be accessed through the WAN 104. Although the file server 103 is illustrated as an example, the file server 103 can generally be any server, such as a Web server and an operational server, in which there is a need for storing data in the online storage service 105.

A CIFS/NFS service 106 and a capacity expansion module 107 operate in the file server 103. A secondary storage device 111 stores a configuration block DB group 108, a meta information DB group 109, a file configuration DB group 110, and a cache block file 112. Although not illustrated, the file server 103 includes a CPU (MPU) and a memory for operating various programs.

The CIFS/NFS service 106 is a service for operating a local file according to a request and returning requested data when there is an access from a user terminal through a CIFS/NFS protocol and is a section that provides basic functions of the file server.

The capacity expansion module 107 mounts a designated storage area of the online storage service 105 on a designated local folder on the file server 103 to process a file operation request for the folder, reads file data in the storage area on the online storage service 105, and executes data synchronization processing from the file server 103 to the storage area. This module allows using the storage area on the online storage service 105 to seamlessly expand the storage capacity on the file server 103.

A file written in the folder mounted with the storage area on the online storage service 105 is saved as cache data in the secondary storage device 111 in a first time and is divided in an upload process by the capacity expansion module 107. A duplication elimination process is applied to the file, and the file is uploaded to the storage area on the online storage service 105. In file reading, data in the local cache block file 112 is returned if there is the data. If the data does not exist, a corresponding configuration block file is downloaded from the online storage service 105. For the simplification, although a block length to be divided is assumed to be a fixed length in the discussion except for a block at the tail end of the file, the invention is not limited to this, and the same discussion applies to the variable length.

The configuration block DBs (group) 108 are divided DBs (group) (see FIG. 3) for managing configuration block files that form the files after the duplication elimination process. The meta information DBs (group) 109 are divided DBs (see FIG. 2) storing meta information of the files. The file configuration DBs (group) 110 are divided DBs (see FIG. 4) for managing which configuration block files form the files. The divided DBs denote DBs formed by dividing a DB into a plurality of DBs (see FIG. 5). The reason that each DB is handled as divided DBs is to improve the transfer efficiency of data by uploading only an updated section when DB information is to be uploaded to the online storage service through the WAN. To manage updated divided DBs, a divided DB management table is held for each divided DB group in the capacity expansion module.

Meanwhile, the storage area of the online storage service 105 stores a configuration block file group 113, a meta information DB file group 114, a configuration block DB file group 115, and a file configuration DB file group 116. The configuration block file group 113 is a set of configuration block files after the elimination of duplication. The meta information DB file group 114 is a DB file group of the meta information DB group 109 on the file server 103. Similarly, the configuration block DB file group 115 is a DB file group of the configuration block DB group 108. The file configuration DB file group 116 is a DB file group of the file configuration DB group 110.

If Amazon S3 is assumed as an example of the online storage service 105, the storage area is equivalent to a "bucket". A kernel module (for example, a FUSE-based file system module) that mounts the bucket on a specific directory can be considered as a specific example of implementation of the capacity expansion module 107. Although the implementation is assumed in the following description, this does not limit the present invention.

<Meta Information DB>

Figure 2:
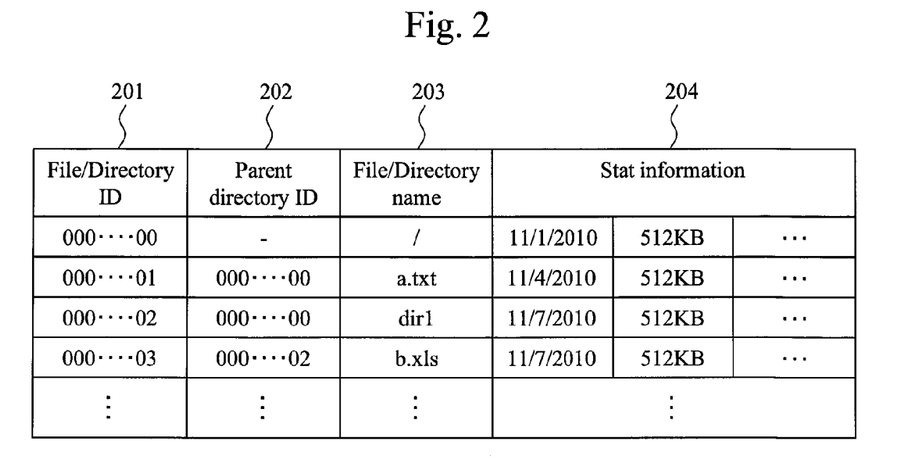
FIG. 2 is a diagram showing a configuration example of a meta information DB table.

FIG. 2 is a diagram showing a configuration example of the meta information DB 109. The meta information DB 109 includes a table for managing attributes of files and directories. The relationship between the files and the directories can be figured out by the meta information DB 109.

For example, the table includes, as constituent attributes, a file/directory ID 201, a parent directory ID 202, a file/directory name 203, and Stat information 204.

The file/directory ID 201 includes unique IDs for identifying the files and the directories. The parent directory ID 202 denotes the file/directory ID 201 of parent directories of the files or directories of the file/directory ID 201 in a directory structure constructed in the mounted folder. The file/directory name 203 indicates name information of the files and directories designated by the file/directory ID 201. The Stat information 204 stores data of Stat structures, such as update date and time, size, and mode.

<Configuration Block DB>

Figure 3:
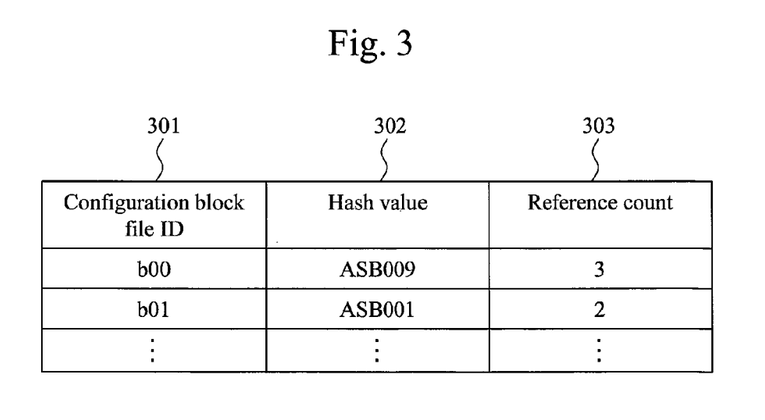
FIG. 3 is a diagram showing a configuration example of a configuration block DB table.

FIG. 3 is a diagram showing a configuration example of the configuration block DB 108. The configuration block DB 108 includes a table for managing attributes of blocks (also called chunks) forming the files. The table includes, as constituent attributes, a configuration block file ID 301, a hash value 302, and a reference count 303.

The configuration block file ID 301 includes identification IDs of configuration block files to be saved in the online storage service after the duplication elimination process. The hash value 302 includes hash values of the configuration block files, and values calculated by hash algorithms, such as MD5 and SHA256, are stored. The reference count 303 indicates the numbers of references when there are files including the configuration block files as constituent elements. When the reference count 303 is 0, it indicates that the configuration block file is no longer a constituent element of any file, and the entry is deleted from the configuration block DB 108.

<File Configuration DB>

Figure 4:
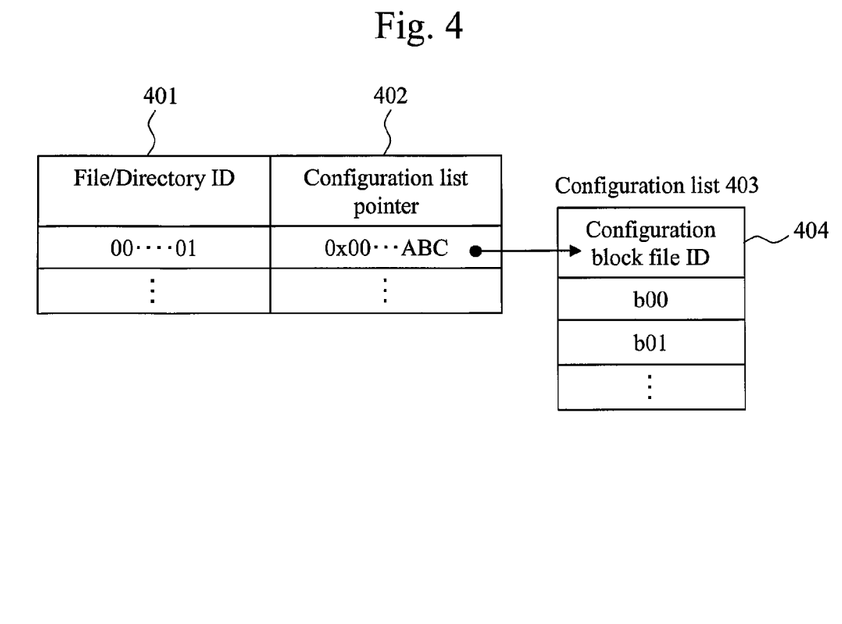
FIG. 4 is a diagram showing a configuration example of a file configuration DB table.

FIG. 4 is a diagram showing a configuration example of the file configuration DB 110. The file configuration DB 110 is a table for managing which set of blocks (chunks) forms each file. The table includes, as attributes, a file/directory ID 401 and a configuration list pointer 402.

The configuration list pointer 402 stores pointers pointing a configuration list 403. The configuration list 403 stores a configuration block file ID 404 in list structures. Individual files include sets of configuration block files, and the table manages the configuration information. More specifically, the list of the configuration block file ID 404 in the configuration list 403 indicates, sequentially from the top, permutation of the configuration block files forming the files of the file/directory ID 401. From the table, for example, it can be recognized that the files indicated by file/directory ID=00 . . . 01 include configuration block files of b00, b01, . . . .

<Process of Accessing Divided DBs>

Figure 5:
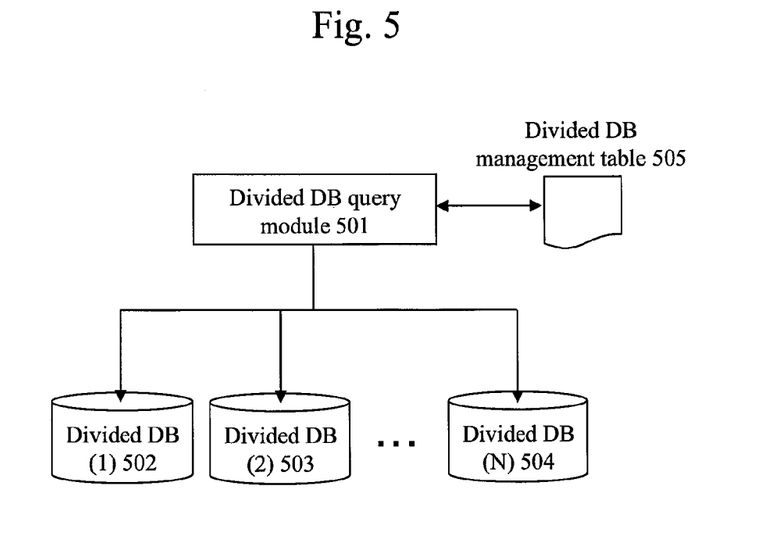
FIG. 5 is a diagram showing a concept of a process of accessing divided DBs.

FIG. 5 is a diagram for describing a concept of a process of accessing divided DBs. All three DBs of the configuration block DB group 108, the meta information DB group 109, and the file configuration DB group 110 handled in the file server 103 are divided DBs, and FIG. 5 illustrates a summary of the process of accessing regarding the three divided DBs.

In FIG. 5, a divided DB query module 501 is a module in the capacity expansion module 107 and is a module that issues a query for a divided DB. To search a file by a key value, the divided DB query module 501 calculates a hash value of the key value to query a divided DB management table 505. The divided DB query module 501 acquires a divided DB identification number indicating the divided DB that stores the file and issues a query to the corresponding divided DB.

In a case of a query for updating a divided DB, the divided DB query module 501 turns on a Dirty flag in a corresponding entry in the divided DB management table and manages the updated divided DB after periodical synchronization processing.

<Divided DB Management Table>

Figure 6:
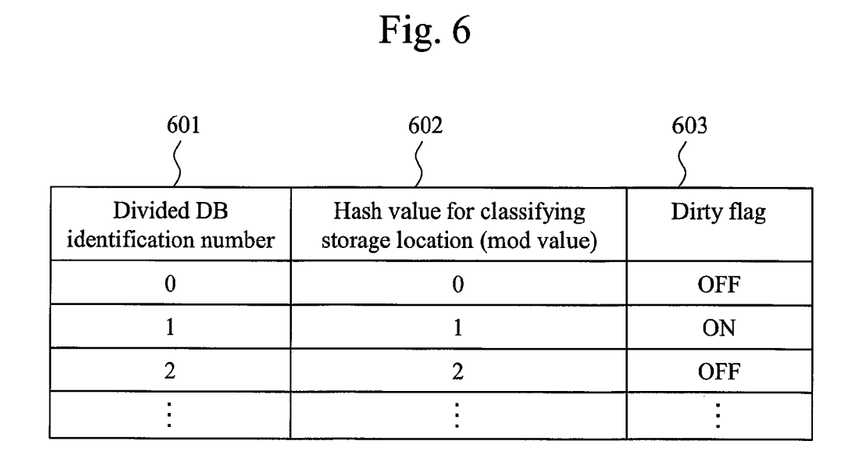
FIG. 6 is a diagram showing a configuration example of a divided DB management table.

FIG. 6 is a diagram showing a configuration example of a divided DB management table. A divided DB management table 505 includes, as attributes, a divided DB identification number 601; a hash value 602 for classifying storage location, and a Dirty flag 603. The divided DB management table 505 exists for each of the configuration block DB 108, the meta information DB 109, and the file configuration DB 110.

The divided DB identification number 601 includes IDs provided to the individual divided DBs. The hash value 602 for classifying storage location includes hash values for calculating the hash values when key values of search are provided to indicate which divided DB stores the data. The Dirty flag 603 includes flags indicating whether the corresponding divided DBs are updated after process of synchronization with the online storage service, and the Dirty flag 603 is used to determine whether to upload the divided DBs in the next synchronization processing.

<File Open Process>

Figure 7:
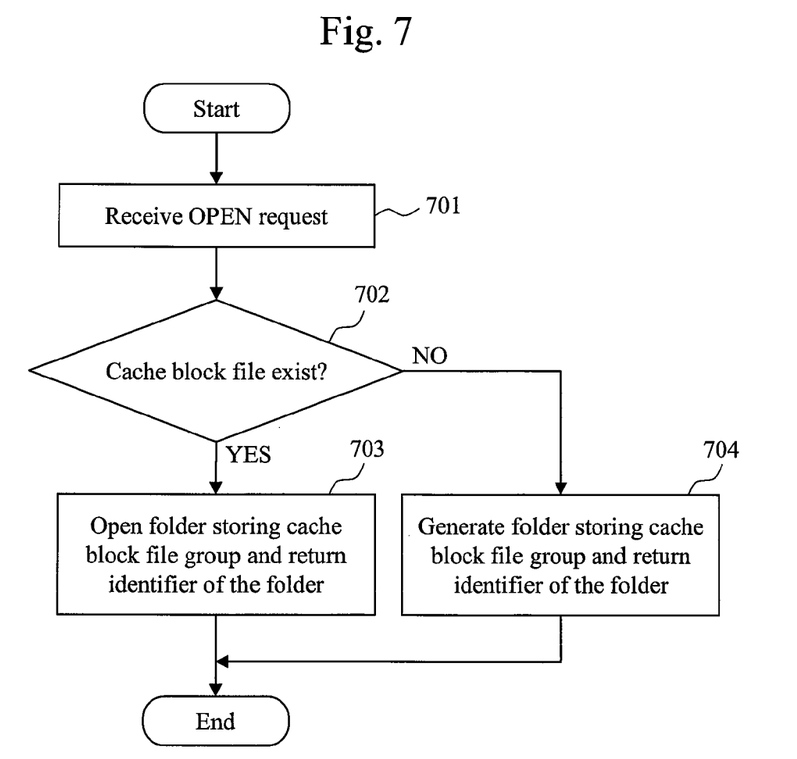
FIG. 7 is a flow chart for describing a file open process for a mount folder.

FIG. 7 is a flow chart diagram for describing a file open process for a mount folder.

When an OPEN request is issued for a file in a mount folder, the capacity expansion module 107 receives the OPEN request (step 701) and checks whether the cache block file of the OPEN-requested file exists in the secondary storage device 111 (step 702).

If the cache block file exists in the secondary storage device 111, the capacity expansion module 107 opens the folder storing the cache block file group and returns the file identifier to an upper level (step 703).

If the cache block file does not exist in the secondary storage device 111, the capacity expansion module 107 generates a folder for storing the cache block file group on the secondary storage device 111 and returns the file identifier to the upper level (step 704).

<File Read Process>

Figure 8:
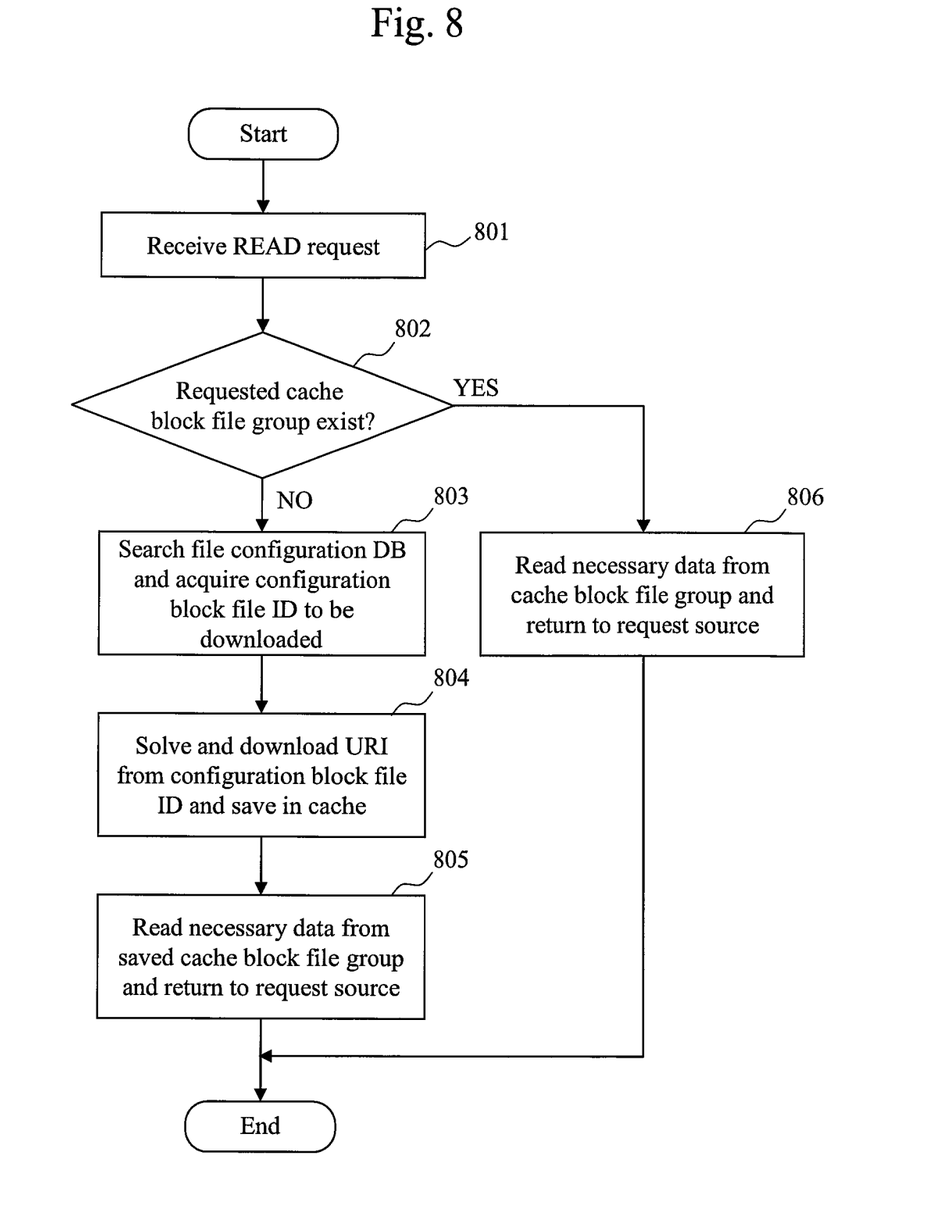
FIG. 8 is a flow chart for describing a file read process for a mount folder.

FIG. 8 is a flow chart for describing a file read process for a mount folder.

When a READ request is issued for a file in a mount folder, the capacity expansion module 107 receives the READ request (step 801) and determines which block file of the READ-requested file is requested based on an offset and a size to check whether the corresponding cache block file exists in the secondary storage device (step 802).

If the cache block exists in the secondary storage device 111, the capacity expansion module 107 reads necessary data from the cache block file group and packs the data into a READ buffer to return the READ buffer to the request source (step 808).

If the cache block does not exist in the secondary storage device 111, the capacity expansion module 107 searches the file configuration DB based on the offset value and the size that are arguments of the READ request and acquires the configuration block file ID to be downloaded (step 803). The capacity expansion module 107 solves and downloads a storage location URI on the online storage service 105 from the acquired configuration block file ID to save the data in the cache (step 804) and further reads necessary data from the saved cache block file group 112 and packs the data into a READ buffer to return the READ buffer to the request source (step 805).

<File Write Process>

Figure 9:
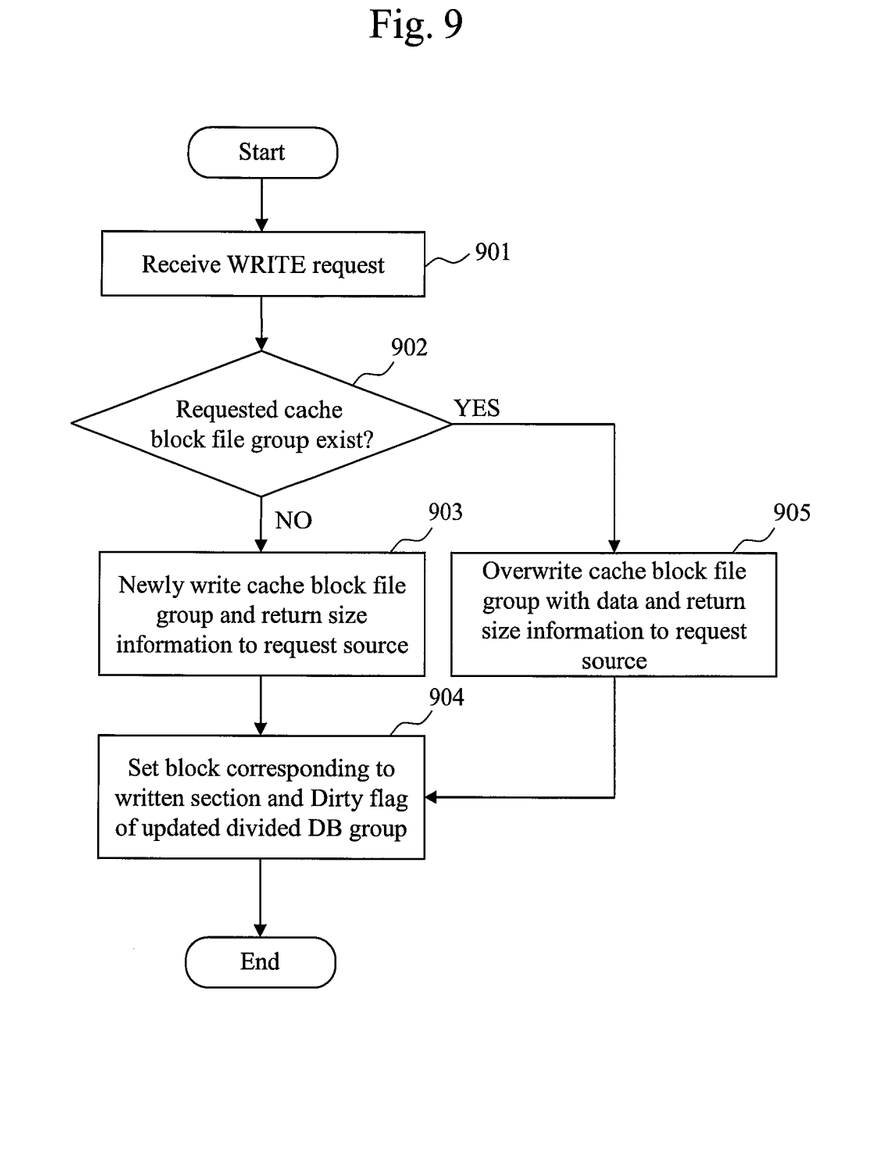
FIG. 9 is a flow chart for describing a file write process for a mount folder.

FIG. 9 is a flow chart for describing a file write process for a mount folder.

When a WRITE request is issued to a file in a mount folder, the capacity expansion module 107 receives the WRITE request (step 901) and determines which block file of the WRITE-requested file is requested based on an offset and a size to check whether the corresponding cache block file exists in the secondary storage device (step 902).

If the cache block file exists in the secondary storage device, the capacity expansion module 107 overwrites the corresponding cache block file group with data and returns the size information to the request source (step 905).

If the cache block file does not exist in the secondary storage device, the capacity expansion module 107 newly writes a cache block file group and returns the size information to the request source (step 903). The capacity expansion module 107 sets a block corresponding to the written section as well as the Dirty flag of the updated divided DB group and records that there is an update (step 904).

<File Delete Process>

Figure 10:
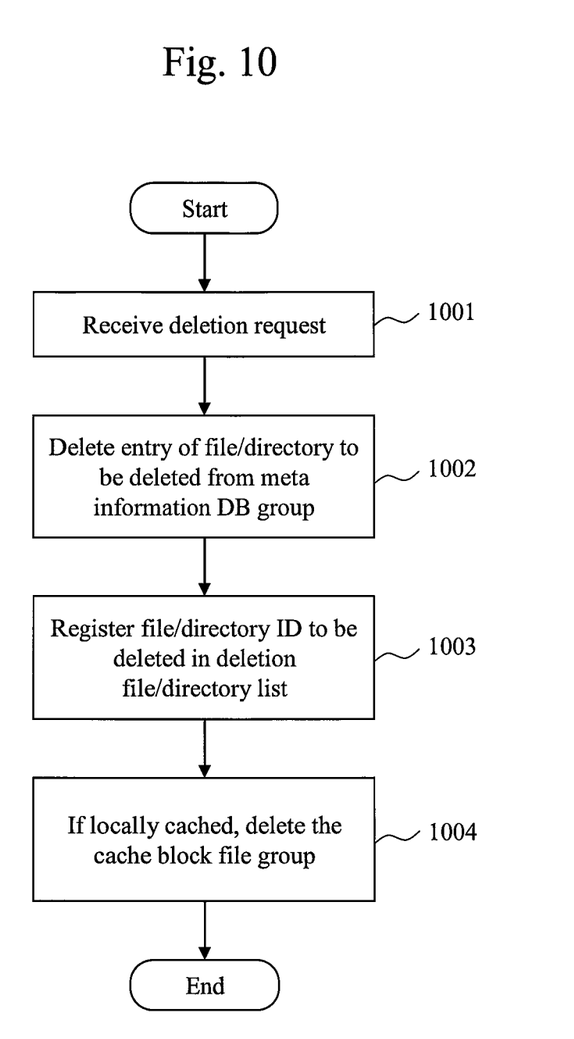
FIG. 10 is a flow chart for describing a file delete process for a mount folder.

FIG. 10 is a flow chart for describing a file delete process (deletion reserving process) for a mount folder.

When a deletion request is issued for a file/directory in a mount folder, the capacity expansion module 107 receives the deletion request (step 1001) and deletes the entry of the file or the directory to be deleted from the meta information DB group (step 1002).

Subsequently, the capacity expansion module 107 registers the file/directory ID to be deleted in a deletion file/directory list (not shown) managed by the capacity expansion module (step 1003). The deletion target is registered in the list here, and the actual deletion is performed at predetermined timing. Therefore, the data is not immediately deleted, but the data is registered in the list to acknowledge that the file is to be erased at the predetermined timing.

If the cache block file group of the files to be deleted is locally saved, the capacity expansion module 107 further deletes the files (step 1004). The duplication elimination process is not applied to the cached data. The deletion of the cached data is not a process executed in conjunction with the process executed in steps 1002 and 1003. Therefore, the deletion can be performed at any timing after the reception of the deletion request.

<Data Upload Process>

Figure 11:
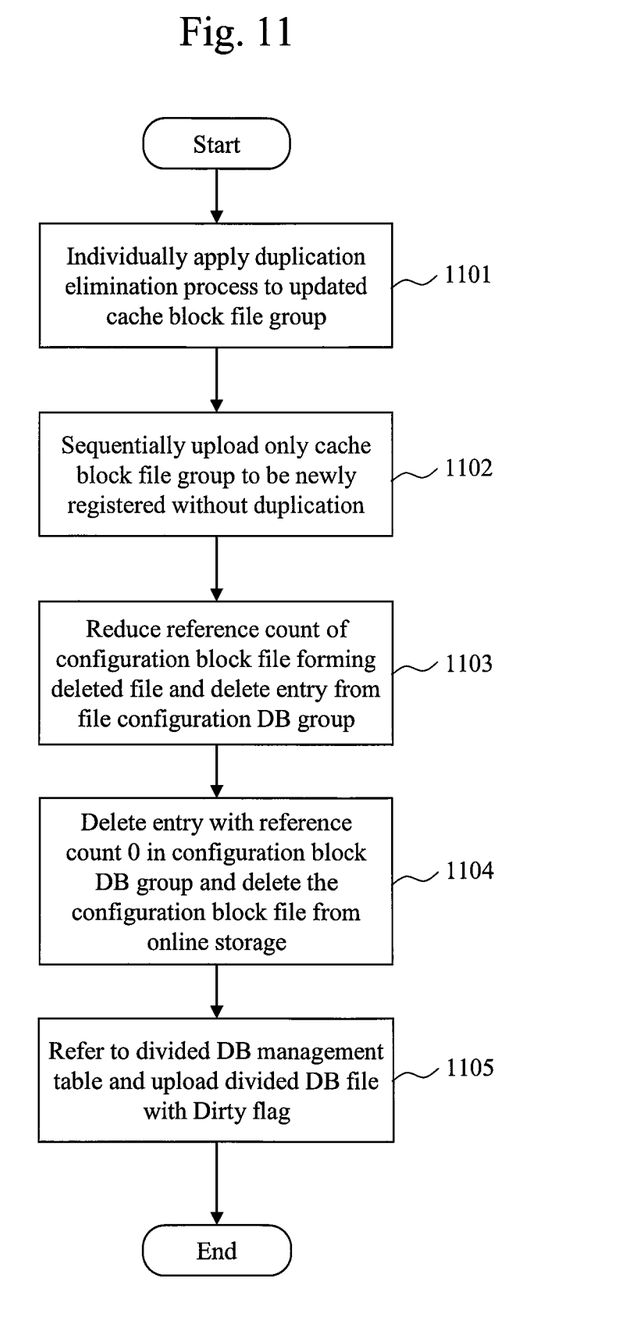
FIG. 11 is a flow chart for describing an upload process of cache data.

FIG. 11 is a flow chart for describing an upload process of cache data. The capacity expansion module 107 activates an upload process thread for uploading the update data in the file server to the online storage service for synchronization at a designated time interval.

In the thread, the capacity expansion module 107 individually applies a duplication elimination process to the updated cache block file group to check whether the cache block file is included in the already registered configuration block file group (step 1101). Details of the duplication elimination process will be described later in FIG. 12. As can be recognized from FIG. 12, the Dirty flag is ON when the process of step 1101 is finished in the case of file update. This is because the Dirty flag is set to ON in step 1206.

The capacity expansion module 107 executes the duplication elimination process and sequentially uploads the newly registered cache block file group without duplication to the online storage service 105 (step 1102).

The capacity expansion module 107 refers to the deletion file/directory list and the file configuration DB group 110 to reduce the reference counts of the configuration block DB group 108 by one for the configuration block files that form the deleted files, deletes the corresponding entries in the file configuration DB group 110, and turns on the Dirty flags of the corresponding divided DBs (step 1103).

The capacity expansion module 107 deletes the entries, in which the reference counts of the configuration block DB group 108 have become 0, and deletes the corresponding configuration block files from the online storage service 105 (step 1104).

Subsequently, the capacity expansion module 107 refers to the divided DB management tables 505 (FIG. 6) regarding the divided DBs and uploads the divided DB files with Dirty flags (step 1105).

The capacity expansion module 107 finishes the upload process thread when the upload is completed and finishes the data synchronization processing between the file server and the online storage service.

<Duplication Elimination Process>

Figure 12:
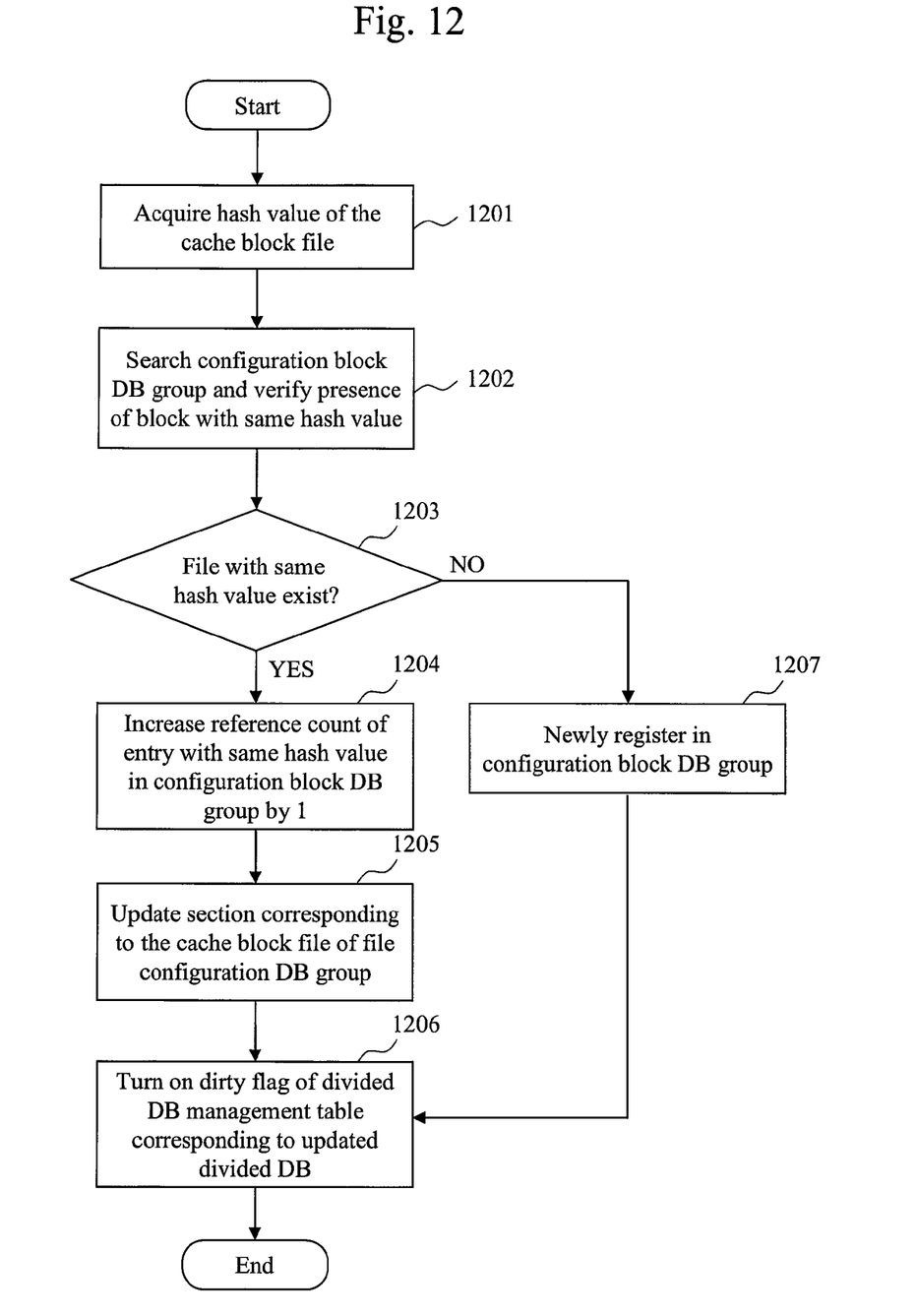
FIG. 12 is a flow chart for describing a duplication elimination process of a cache block file.

FIG. 12 is a flow chart for describing a duplication elimination process of a cache block file.

When a cache block file to be checked is provided, the capacity expansion module 107 first acquires the hash value of the cache block file (step 1201).

The capacity expansion module 107 then searches the configuration block DB group 108 to check whether there is a block with the same hash value in the DB group (step 1202).

If there is no file as a result of the verification of the existence of the file with the same hash value (No in step 1203), the capacity expansion module 107 newly adds and registers an entry in the configuration block DB (step 1207) and turns on the Dirty flag on the divided DB management table 505 corresponding to the updated divided DB in the configuration block DB group 108 (step 1206).

On the other hand, if there is a file with the same hash value (Yes in step 1203), the capacity expansion module 107 increases the reference count of the entry with the same hash value in the configuration block DB group 108 by one (step 1204) and updates the configuration block file ID in the configuration list corresponding to the cache block file of the file configuration DB group 110 (step 1205). The capacity expansion module 107 turns on the Dirty flag on the divided DB management table 505 corresponding to the divided DB of the updated configuration block DB group 108 and the file configuration DB group 110 (step 1206).

According to the configuration, data is compressed by elimination of duplication in the file server 103 on the local side when the data is saved on the online storage service 105. In this way, the amount of data retained in the online storage service 105 and the amount of communication can be reduced, and the amount of charge can be saved. The synchronization processing and the download processing can be speeded up by reducing the amount of communication. The synchronization processing can be speeded up by implementing the mechanism of dividing the DBs, such as the meta information DBs and the configuration block DBs, to manage the updated sections to upload only the updated sections to the online storage service.

CONCLUSION

In the present embodiment, each of the configuration block DB, the file configuration DB, and the meta information DB includes a plurality of divided databases formed by dividing the stored information into a plurality of databases. The duplication in the plurality of configuration blocks stored in the configuration block DB is eliminated to generate the duplication-eliminated configuration block group. In the configuration block DB, the information of the degree of duplication (reference count) indicating the degree of each of the plurality of configuration blocks being commonly used in other files is managed. The duplication-eliminated configuration block group, the configuration information of the plurality of configuration blocks, and the meta information are uploaded to the online storage service. In this way, the data can be saved in the online storage service, with the duplication of the data being eliminated. Therefore, the amount of charge for the used capacity and the amount of communication can be saved.

Furthermore, in the present embodiment, whether the added or updated configuration block overlaps with the plurality of configuration blocks in the configuration block DB is determined. The information of the degree of duplication (reference count value) is updated (reference count value is incremented) for the duplicated configuration block. The information of the divided DB in the configuration DB storing the updated configuration block is uploaded to the online storage service. In this way, only the divided DB as an updated section is uploaded to the online storage service. Therefore, the amount of communication between the file server (information providing server) and the online storage service can be reduced, and the transfer speed can be increased.

When data of a configuration block is updated in the configuration block DB, change occurrence information (Dirty flag) indicative of an occurrence of a change in the divided DB, to which the updated configuration block belongs, is managed. More specifically, the Dirty flag is provided to the information for managing the divided DB. Only the divided DB, to which the updated configuration block belongs, is uploaded to the online storage service according to the change occurrence information. The same applies when a configuration block is newly added, and if it is determined that there is no other duplicated configuration blocks in the configuration block DB regarding the added configuration block, the change occurrence information (Dirty flag) indicative of occurrence of a change in the divided DB, to which the added configuration block belongs, is provided to the information for managing the divided DB. Only the divided DB, to which the added configuration block belongs, is uploaded to the online storage service according to the change occurrence information. In this way, even if the information on the database is updated or information is newly added, not all information on the database is uploaded to the online storage service, but only the divided DB including the updated information is uploaded. Therefore, the synchronization processing of the update data can be executed while reducing the amount of communication in the upload.

The information of the degree of duplication (reference count value) includes a count value indicating the number of times the configuration block is referenced in other files. When a deletion request of the configuration block is issued, the reference count value is reduced in response to the deletion request. If there is a configuration block in which the count value has become 0, the change occurrence information (Dirty flag) indicative of deletion of the configuration block in the divided DB, to which the configuration block with the count value 0 belongs, is provided to the information for managing the divided DB. The divided DB, to which the deleted configuration block belongs, is uploaded to the online storage service according to the change occurrence information.

If a file read request is issued from the user terminal, the configuration block corresponding to the target file of the file read request is specified based on the file configuration DB. The information storage location on the online storage service is specified (storage location URL is solved) for the specified configuration block. The target configuration block is downloaded from the online storage service and cached in the computer for providing information to form read data to provide the read data to the user terminal. In this way, the performance in data download during READ can be improved while reducing the communication data between the online storage service and the file server.

The present invention is not limited to the embodiment, and in an execution phase, the constituent elements can be modified without departing from the concept of the present invention to embody the present invention. Appropriate combinations of a plurality of constituent elements disclosed in the embodiment can form various inventions. For example, some of the constituent elements illustrated in the embodiment may be deleted. Constituent elements across different embodiments may also be appropriately combined.

Part or all of the configurations, functions, processing units, processing sections, and the like illustrated in the embodiment may be realized by hardware, such as by designing an integrated circuit. A processor may interpret and execute programs for realizing the functions to realize the configurations, functions, and the like by software. The programs for realizing the functions and the like as well as information, such as tables and files, can be stored in a recording or storage device, such as a memory, a hard disk, and an SSD (Solid State Drive), or in a recording or storage medium, such as an IC card, an SD card, and a DVD.

In the embodiment, control lines and information lines considered necessary for the description are illustrated, and all control lines and information lines in a product are not necessarily illustrated. All components may be connected to each other.

REFERENCE SIGNS LIST

101 . . . user terminal
102 . . . LAN
103 . . . file server
104 . . . WAN
105 . . . online storage service
106 . . . CIFS/NFS service
107 . . . capacity expansion module
108 . . . configuration block DB group
109 . . . meta information DB group
110 . . . file configuration DB group
111 . . . secondary storage device
112 . . . cache block file group
113 . . . configuration block file group
114 . . . meta information DB file group
115 . . . configuration block DB file group
116 . . . file configuration DB file group 117 . . . storage are
201 . . . file/directory ID
202 . . . parent directory ID
203 . . . file/directory name
204 . . . Stat information
301 . . . configuration block ID
302 . . . hash value
303 . . . reference count
401 . . . file/directory ID
402 . . . configuration list pointer
403 . . . configuration list
404 . . . configuration block file ID
501 . . . divided DB query module
502 . . . divided DB
505 . . . divided DB management table
601 . . . divided DB identification number
602 . . . hash value for classifying storage location
603 . . . Dirty flag

The invention claimed is:

1. An information management method in an information processing system comprising: a plurality of user terminals, a computer for providing information that provides information in response to a request from at least one of the user terminals, and an online storage service that stores the information to be provided, wherein the computer for providing information includes: a processor; a configuration block database for managing information of a plurality of configuration blocks obtained by dividing each of a plurality of files received from each of the user terminals; a file configuration database for managing configuration information of the plurality of configuration blocks of the plurality of files; and a meta information database for managing meta information including a directory configuration of each of the plurality of files, wherein each of the configuration block database, the file configuration database, and the meta information database comprises a plurality of divided databases formed by dividing stored information, and wherein the computer for providing information is connected with each of the user terminals via a LAN and is also connected with the online storage service via a WAN, and the information management method comprising:

the processor eliminating duplication in the plurality of configuration blocks stored in the configuration block database to generate a duplication-eliminated configuration block group;

the processor managing information of a degree of duplication indicating a degree of each of the plurality of configuration blocks being commonly used in other files; and the processor uploading the duplication-eliminated configuration block group, the configuration information of the plurality of configuration blocks, and the meta information to the online storage service.

2. The information management method according to claim 1, further comprising:

the processor determining whether an added or updated configuration block overlaps with the plurality of configuration blocks in the configuration block database;

the processor updating the information of the degree of duplication for a duplicated configuration block; and uploading information of the divided database in the configuration block database that stores the updated configuration block to the online storage service.

3. The information management method according to claim 2, further comprising:

when data of a configuration block is updated in the configuration block database, the processor managing change occurrence information indicative of an occurrence of a change in the divided database to which the updated configuration block belongs, and in the uploading, the processor uploads the divided database, to which the updated configuration block belongs, to the online storage service according to the change occurrence information.

4. The information management method according to claim 2, further comprising:

when it is determined that there is no duplicated configuration block in the configuration block database regarding the added configuration block, the processor managing change occurrence information indicative of an occurrence of a change in the divided database to which the added configuration block belongs, and in the uploading, the processor uploads the divided database, to which the added configuration block belongs, to the online storage service according to the change occurrence information.

5. The information management method according to claim 2, wherein the information of the degree of duplication comprises a count value indicating the number of times the configuration block is referenced in other files, in the updating the information of the degree of duplication, the processor reduces the count value of the degree of duplication in response to a deletion request of the configuration block, the information management method further comprises when there is a configuration block in which the count value of the degree of duplication has become 0, the processor managing change occurrence information indicative of deletion of the configuration block in the divided database to which the configuration block with the count value 0 belongs, and in the uploading, the processor uploads the divided database, to which the deleted configuration block belongs, to the online storage service according to the change occurrence information.

6. The information management method according to claim 1, further comprising:

the processor specifying the configuration block corresponding to a target file of a file read request based on the file configuration database;

the processor specifying an information storage location on the online storage service regarding the specified configuration block;

the processor downloading the configuration block from the online storage service; and the processor caching the configuration block in the computer for providing information to form read data to respond to the file read request.

7. A computer for providing information that acquires information from an online storage service in response to a request from at least one user terminal of a plurality of user terminals to provide the information to the at least one user terminal, the computer for providing information comprising:

a processor; and at least one storage medium storing:

a configuration block database for managing information of a plurality of configuration blocks obtained by dividing each of a plurality of files received from each of the user terminals;

a file configuration database for managing configuration information of the plurality of configuration blocks of the plurality of files;

and a meta information database for managing meta information including a directory configuration of each of the plurality of files, wherein each of the configuration block database, the file configuration database, and the meta information database comprises a plurality of divided databases formed by dividing stored information, and wherein the computer for providing information is connected with each of the plurality of user terminals via a LAN and is also connected with the online storage service via a WAN, and wherein the processor is configured to:

eliminate duplication in the plurality of configuration blocks stored in the configuration block database to generate a duplication-eliminated configuration block group, manage information of a degree of duplication indicating a degree of each of the plurality of configuration blocks being commonly used in other files, and upload the duplication-eliminated configuration block group, the configuration information of the plurality of configuration blocks, and the meta information to the online storage service.

8. The computer for providing information according to claim 7, wherein the processor is further configured to:

determine whether an added or updated configuration block overlaps with the plurality of configuration blocks in the configuration block database, and update the information of the degree of duplication for a duplicated configuration block to upload information of the divided database in the configuration block database that stores the updated configuration block to the online storage service.

9. The computer for providing information according to claim 8, wherein the processor is further configured to:

when data of a configuration block is updated in the configuration block database, manage change occurrence information indicative of an occurrence of a change in the divided database to which the updated configuration block belongs, and upload the divided database, to which the updated configuration block belongs, to the online storage service according to the change occurrence information.

10. The computer for providing information according to claim 8, wherein the processor is further configured to:

when it is determined that there is no duplicated configuration block in the configuration block database regarding the added configuration block, manage change occurrence information indicative of an occurrence of a change in the divided database to which the added configuration block belongs, and upload the divided database, to which the added configuration block belongs, to the online storage service according to the change occurrence information.

11. The computer for providing information according to claim 8, wherein the information of the degree of duplication comprises a count value indicating the number of times the configuration block is referenced in other files, and wherein the processor is further configured to:

reduce the count value of the degree of duplication in response to a deletion request of the configuration block, when there is a configuration block in which the count value of the degree of duplication has become 0, manage change occurrence information indicative of deletion of the configuration block in the divided database to which the configuration block with the count value 0 belongs, and upload the divided database, to which the deleted configuration block belongs, to the online storage service according to the change occurrence information.

12. The computer for providing information according to claim 7, wherein the processor is further configured to:

specify the configuration block corresponding to a target file of a file read request based on the file configuration database, specify an information storage location on the online storage service regarding the specified configuration block, download the configuration block from the online storage service, and cache the configuration block in the computer for providing information to form read data to respond to the file read request.

* * * * *